(12) United States Patent
Schultz et al.

(10) Patent No.: US 10,035,909 B2
(45) Date of Patent: Jul. 31, 2018

(54) HIGH MAGNESIUM SURFACE CONCENTRATION NANOCALCITE COMPOSITES

(75) Inventors: William J. Schultz, North Oaks, MN (US); Mary I. Buckett, Woodbury, MN (US); Peter D. Condo, Lake Elmo, MN (US); Douglas P. Goetz, St. Paul, MN (US); Chad A. Haraldson, Apple Valley, MN (US); Mark McCormick, Minneapolis, MN (US); Wendy L. Thompson, Roseville, MN (US); Steven J. Pachuta, Eagan, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 188 days.

(21) Appl. No.: 13/502,836

(22) PCT Filed: Dec. 17, 2009

(86) PCT No.: PCT/US2009/068374
§ 371 (c)(1),
(2), (4) Date: Apr. 19, 2012

(87) PCT Pub. No.: WO2011/075126
PCT Pub. Date: Jun. 23, 2011

(65) Prior Publication Data
US 2012/0245253 A1    Sep. 27, 2012

(51) Int. Cl.
*C08L 63/00*    (2006.01)
*C08K 3/26*    (2006.01)
(Continued)

(52) U.S. Cl.
CPC ............... *C08L 63/00* (2013.01); *C08K 3/26* (2013.01); *C08K 9/04* (2013.01); *C08K 5/42* (2013.01)

(58) Field of Classification Search
CPC ........ C08G 59/00; C08G 59/02; B82Y 30/00; B82Y 40/00; B01F 3/18; B01F 3/12; B82B 3/00
(Continued)

(56) References Cited

U.S. PATENT DOCUMENTS

| | | |
|---|---|---|
| 4,447,564 A | 5/1984 | Grimmer |
| 4,478,963 A | 10/1984 | McGarry |

(Continued)

FOREIGN PATENT DOCUMENTS

| | | |
|---|---|---|
| EP | 1 426 390 | 6/2004 |
| EP | 2 036 944 | 3/2009 |

(Continued)

OTHER PUBLICATIONS

STN Registry CAS No. 3037-89-6, pp. 1.*
(Continued)

*Primary Examiner* — Randy P Gulakowski
*Assistant Examiner* — Ha S Nguyen
(74) *Attorney, Agent, or Firm* — Philip P. Soo

(57) ABSTRACT

Compositions comprising surface-modified calcite nanoparticles dispersed in a curable resin and to coatings and fibrous composites incorporating such compositions are described. The nanocalcite particles have a high magnesium to calcium surface concentration ratio. The surface-modifying agents include a binding group ionically associated with the nanoparticles, and a compatiblizing segment compatible with the curable resin. The surface-modifying agent may also include a reactive group capable of reacting with the curable resin. Methods of preparing nanocalcite composites, and coatings and fibrous composites prepared from such nanocalcite composites are also described.

28 Claims, 6 Drawing Sheets

(51) Int. Cl.
*C08K 9/04* (2006.01)
*C08K 5/42* (2006.01)
*C08K 9/08* (2006.01)

(58) Field of Classification Search
USPC ........ 523/435; 427/372.2; 428/323; 525/242
See application file for complete search history.

(56) References Cited

U.S. PATENT DOCUMENTS

| | | | |
|---|---|---|---|
| 4,624,971 A | | 11/1986 | van Tao et al. |
| 5,194,334 A | * | 3/1993 | Uerdingen et al. ............ 428/416 |
| 5,317,067 A | * | 5/1994 | Yagi et al. ..................... 525/438 |
| 5,648,407 A | | 7/1997 | Goetz et al. |
| 5,694,701 A | | 12/1997 | Huelsmann et al. |
| 5,980,697 A | | 11/1999 | Kolb et al. |
| 6,342,100 B1 | | 1/2002 | Nover |
| 7,596,986 B2 | | 10/2009 | Daniels et al. |
| 2001/0040007 A1 | | 11/2001 | Hartman et al. |
| 2002/0156152 A1 | | 10/2002 | Zhang et al. |
| 2003/0032693 A1 | | 2/2003 | Angeletakis et al. |
| 2003/0055207 A1 | * | 3/2003 | Xu et al. ....................... 528/274 |
| 2004/0076574 A1 | | 4/2004 | Xu et al. |
| 2004/0092639 A1 | | 5/2004 | Kasahara et al. |
| 2005/0288435 A1 | | 12/2005 | Pfaendner |
| 2007/0199477 A1 | | 8/2007 | Hill et al. |
| 2007/0258877 A1 | * | 11/2007 | Nover et al. .................. 423/430 |
| 2008/0075963 A1 | | 3/2008 | Dershem |
| 2008/0227901 A1 | | 9/2008 | Lefevre et al. |
| 2009/0137706 A1 | | 5/2009 | Healy et al. |
| 2010/0273920 A1 | * | 10/2010 | Bernard ............. C08G 18/5024 524/114 |
| 2011/0034585 A1 | | 2/2011 | Christmann et al. |

FOREIGN PATENT DOCUMENTS

| | | | | |
|---|---|---|---|---|
| FR | WO 9837122 A1 | * | 8/1998 | ........... C08G 65/329 |
| FR | 2923834 A1 | * | 5/2009 | ......... C08G 18/5024 |
| JP | 57198735 A | * | 12/1982 | |
| JP | 04332785 A | * | 11/1992 | |
| JP | 2006 188552 | | 7/2006 | |
| WO | WO 00/49081 | | 8/2000 | |
| WO | WO 2002/00770 | | 1/2002 | |
| WO | WO 2003/057740 | | 7/2003 | |
| WO | WO 2004/031302 | | 4/2004 | |
| WO | WO 2010/080459 | | 4/2004 | |
| WO | WO 2005071003 A1 | * | 8/2005 | |
| WO | WO 2007/014878 | | 2/2007 | |
| WO | WO 2007/108217 | | 9/2007 | |
| WO | WO 2008/027979 | | 3/2008 | |
| WO | WO 2011/050121 | | 4/2011 | |

OTHER PUBLICATIONS

STN Registry CAS No. 471-34-1, pp. 1-2.*
JP 04-332785 A to Nakao. (English Translation).*
JP 57-198735 A to Saeki et al. (English Translation).*
PCT International Search Report for PCT/US2009/068374 dated Oct. 14, 2010, 3 pages.
Avella et al., "Novel PMMA/CaCO$_3$ Nanocomposites Abrasion Resistant Prepared by an in Situ Polymerization Process," *Nano Letters*, vol. 1, No. 4, pp. 213-217, (2001).
ASTM Designation: D 5045-99, "Standard Test Methods for Plane-Strain Fracture Toughness and Strain Energy Release Rate of Plastic Materials," (2007) 9 pages.
ASTM Designation: D 2583-07, "Standard Test Method for Indentation Hardness of Rigid Plastics by Means of a Barcol Impressor," (2001) 4 pages.
Handbook of Thermoset Plastics, Second Edition, Sidney H. Goodman, Ed. (1998) p. 122.
Jin et al., "Interfacial toughness properties of trifunctional epoxy resins/calcium carbonate nanocomposites," *Materials Science and Engineering A*, 475, pp. 190-193, (2008).
Kresse et al., "Ab initio molecular-dynamics simulation of the liquid metal-amorphous-semiconductor transition in germanium," *Physical Review B*, vol. 49, No. 20, pp. 14251-14271, (May 15, 1994).
Kresse et al., "Ab initio molecular-dynamics for liquid metals," *Physical Review B*, vol. 47, No. 1, pp. 558-561, (Jan. 1, 1993).
Kresse et al., "Efficiency of ab-initio total energy calculations for metals and semiconductors using a plante-wave basis set," *Computational Materials Science* 6, pp. 15-50, (1996).
Kresse et al., "Efficient iterative schemes for ab initio total-energy calculations using a plane-wave basis set" *Physical Review B*, vol. 54, No. 16, pp. 11169-11186, (Oct. 15, 1996).
Lu et al., Polymer/calcium carbonate nanocomposites, *Polymer Nanocomposites*, CRC Press, pp. 412-439, (2006).
Melo et al., "High Energy Mill Processing of Polymer Based Nanocomposites", Journal of Composite Materials, 2363, (2008).
Perdew et al., "Generalized Gradient Approximation Made Simple," *Physical Review Letters*, vol. 77, No. 18, pp. 3865-3868, (Oct. 28, 1996).
Van Krevelen, *Properties of Polymers: Their Correlation with Chemical Structure; Their Numerical Estimation and Prediction from Additive Group Contributions*, third edition, Elsevier Science Publishers B.V., Chapter 7, "Cohesive Properties and Solubility," pp. 189-225, (1990).
Wang et al., "Nano-CaCO$_3$/polypropylene composites made with ultra-high-speed mixer," *Journal of Materials Science Letters* 21, pp. 985-986, (2002).
Yu et al., "Novel Uncured Epoxy Resin/CaCO$_3$ Nanocomposites," *Polymer-Plastics Technology and Engineering*, 45: pp. 809-813, (2006).
Yu et al., "Preparation of Exoxy Resin CaCo$_3$ Nancomposites and Performance of Resultant Powder Coatings," *Journal of Applied Polymer Science*, vol. 101, pp. 2656-2660, (2006).
Yu et al., "Study on nano-CaCO$_3$ modified epoxy powder coatings," *Progress in Organic Coatings*, 55, pp. 296-300, (2006).
Zhang et al., "Preparation and characterization of polystyrene/butyl acrylate/ nano-CaCO$_3$ composites," *Journal of Beijing University Chemical Technology*, 32, pp. 1-4, (2005), English Abstract.

* cited by examiner

HIGH MAGNESIUM SURFACE CONCENTRATION NANOCALCITE COMPOSITES

CROSS REFERENCE TO RELATED APPLICATIONS

This application is a national stage filing under 35 U.S.C. 371 of PCT/US2009/068374 filed Dec. 17, 2009, the disclosure of which is incorporated by reference in its entirety herein.

FIELD

The present disclosure relates to compositions comprising surface-modified nanocalcite particles having high magnesium surface concentrations, dispersed in a curable resin. Coatings and fibrous composites incorporating such compositions, and methods of preparing nanocalcite composites using such compositions are also described.

BACKGROUND

Nanoparticle-containing resins have been used as coatings and as the impregnating resin of fibrous composites. Generally, the addition of nanoparticles provides improved strength-to-weight ratios compared to the pure resins. These materials have been used in a wide variety of applications including coatings for vehicles (e.g., marine gel coats) and wind turbine blades, and composite structures in e.g., sporting goods, wind turbine blades, and vehicle fabrication.

SUMMARY

Briefly, in one aspect, the present disclosure provides a composition comprising surface-modified nanoparticles dispersed in a curable resin. The surface-modified nanoparticles comprise calcite cores having a magnesium 24 isotope to calcium 44 isotope surface concentration ratio of greater than 1 as measured according to the TOF-SIMS Test Procedure, and a first surface-modifying agent comprising a binding group ionically bonded to the nanoparticle and a compatiblizing segment compatible with the curable resin. In some embodiments, the magnesium 24 isotope to calcium 44 isotope surface concentration ratio is greater than 4, or even greater than 10, as measured according to the TOF-SIMS Test Procedure.

In some embodiments, the difference between the solubility parameter of the curable resin and the solubility parameter of the compatiblizing group, as determined according to the Solubility Parameter Procedure, is no greater than 4 J1/2 cm-3/2. In some embodiments, the binding group has a binding energy of at least 1.0 electron volts to calcite as calculated using the Binding Energy Calculation Procedure assuming a stoichiometric surface. In some embodiments, at least 90% of the calcite cores have an average size of less than 400 nm as measured by the Calcite Particle Size Procedure. In some embodiments, at least 70% the calcite cores have an aspect ratio of greater than 1.5.

In some embodiments, the surface-modified nanoparticles further comprise a ligand-rich shell surrounding the calcite core. In some embodiments, the first surface-modifying agent further comprises a reactive group capable of reacting with the curable resin. In some embodiments, the composition further comprises a second surface-modifying agent bonded to the calcite, wherein the second surface-modifying agent comprises a binding group and a reactive group capable of reacting with the curable resin.

In some embodiments, the composition comprises at least 10 wt. % nanoparticles based on the total weight of the nanoparticles and the curable resin. In some embodiments, the composition comprises no greater than 2 wt. % solvent.

In another aspect, the present disclosure provides a cured composition comprising the composition according to any one of the preceding claims, wherein the curable resin is cured. In some embodiments, the first surface-modifying agent is reacted with the curable resin. In some embodiments, the cured composition is bonded to at least a portion of a substrate.

In yet another aspect, the present disclosure provides fibrous composites comprising reinforcing fibers impregnated with a composition of the present disclosure. In some embodiments, the curable resin of the composition is cured. In some embodiments, the first surface-modifying agent is reacted with the curable resin.

In a further aspect, the present disclosure provides a method of making a composition. In some embodiments, the method comprises: (i) selecting a calcite having a magnesium 24 isotope to calcium 44 isotope surface concentration ratio of greater than 4 as measured according to the TOF-SIMS Test Procedure; (ii) milling the calcite until greater than 90% of the calcite has an average size of less than 400 nm as measured by the Calcite Particle Size Procedure; (ii) ionically bonding a binding group of a first surface modifying agent to the calcite, wherein the binding group has a binding energy of at least 1.0 electron volts to calcite as calculated using the Binding Energy Calculation Procedure assuming a stoichiometric surface; and (iv) dispersing the surface-modified calcite in a curable resin to form a dispersion, wherein the difference between the solubility parameter of the curable resin and the solubility parameter of a compatiblizing group of the first surface modifying agent, as determined according to the Solubility Parameter Procedure, is no greater than 4 J1/2 cm-3/2. In some embodiments, steps (i), (ii), and (iii) occur simultaneously. In some embodiments, the method further comprises impregnating fibers with the dispersion. In some embodiments, the method further comprises applying the dispersion to a substrate. In some embodiments, the method further comprises curing the curable resin.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1:
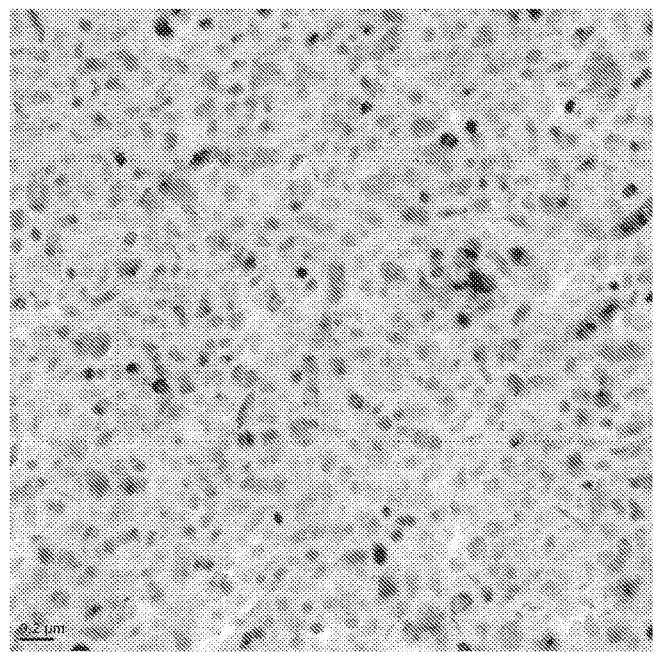
FIG. 1 is a 5000× TEM image of the NanoCa-1 nanocalcite material.

Generally, the compositions of the present disclosure comprise surface-modified nanoparticles dispersed in a curable resin. The surface-modified nanoparticles of the present disclosure comprise calcite cores and a surface-modifying agent bonded to the calcite. Calcite is the crystalline form of calcium carbonate (i.e., calcite and its polymorphs aragonite and vaterite). Calcium carbonate typically forms well-faceted, columnar or plate-like rhombohedral crystals. However, in some cases, calcium carbonate can form highly anisotropic, irregularly-shaped crystals.

Calcium carbonate has been used as a filler in resin systems. However, many commercially available fillers have a large average particle size, e.g., 1 to 10 microns. Even commercially available calcium carbonate material based on nanometer-sized primary particle sizes typically contain aggregates of such primary particles leading to an effective particle size significantly greater than the primary particle size. Even with common surface treatments, such aggregated particles may result in highly viscous resin systems at higher particle loadings.

In general, "aggregated" and "aggregates" are descriptive of a strong association of primary particles often bound together by, for example, residual chemical treatment, covalent chemical bonds, or ionic chemical bonds. Further breakdown of the aggregates into smaller entities is very difficult to achieve. Typically, aggregated particles are not broken down into smaller entities by, for example, shearing forces encountered during dispersion of the aggregated particles in a liquid. In contrast, "agglomerated" and agglomerates" are descriptive of a weak association of primary particles usually held together by charge or polarity. Agglomerated particles can typically be broken down into smaller entities by, for example, shearing forces encountered during dispersion of the agglomerated particles in a liquid.

In some embodiments, for example when using the nanocalcite containing resins to produce fibrous composites, it may be desirable to control, e.g., minimize or even eliminate, filtering of the nanocalcite by the fibers. Larger particles or particle aggregates may be filtered or separated from the resin while the mixture is pressured through a highly compressed fiber array in the process of making a continuous fiber composite. This can result in a non-uniform distribution of particles and resin throughout the final composite resulting in decreased physical properties. In some embodiments of the present disclosure, at least 70%, e.g., at least 75% of the calcite cores have an average size of less than 400 nm. In some embodiments, at least 90%, in some embodiments, at least 95%, or even at least 98% of the calcite cores have an average size of less than 400 nm.

In some embodiments, individual calcite cores are isotropic (e.g., cubic). In some embodiments, individual calcite cores are anisotropic (e.g., needle-like). Generally, as made or as received, nanocalcite samples will contain both isotropic and anisotropic calcite cores. In some embodiments, the calcite is isotropic, i.e., less than 30% of the calcite particles have an aspect ratio (i.e., ratio of major length to minor length) of greater than 1.5. In some embodiments, the calcite is anisotropic, i.e., at least 70% of the calcite particles have an average aspect ratio of greater than 1.5, e.g., at least 2, at least 4, or even at least 8.

Calcite can contain varying amounts of magnesium as an impurity. The magnesium can be concentrated at or near the surface of the calcite nanoparticles, unlike, e.g., dolomite where the magnesium is incorporated into the crystalline structure, i.e., $CaMg(CO_3)_2$. Surprisingly, the present inventors have discovered that an increase in the amount of magnesium at the surface can result in significant improvements in the mechanical properties of nanocalcite composites.

The magnesium levels at the surface of the particles can be measured by time-of-flight secondary ion mass spectroscopy (TOF-SIMS), understanding that the amounts of the elements are relative and not absolute due to the differing sensitivity the instrument has for each element. In some embodiments, the nanocalcite can have a magnesium-24 to calcium-44 integrated peak area ratio ($^{24}Mg$:$^{44}Ca$) of greater than 1, e.g.; greater than 4, greater than 6, greater than 10, or even greater than 15.

In order to obtain a good dispersion of calcite nanoparticles in the resin system, the particles are treated with a surface-modifying agent. Generally, the surface-modifying agents of the present disclosure include at least a binding group and a compatiblizing segment:

Comp. Seg.–Binding Group;

wherein "Comp. Seg." refers to the compatiblizing segment of the surface-modifying agent The compatiblizing segment is selected to improve the compatibility of the calcite nanoparticles with the curable resin. Generally, the selection of the compatiblizing group depends on a number of factors including the nature of the curable resin, the concentration of the nanoparticles, and the desired degree of compatibility. Depending on the specific curable resin, useful compatiblizing agents include polyalkylene oxides, e.g., polypropylene oxide, polyethylene oxide, and combinations thereof. Other useful compatiblizing segments include polyesters and polyether amines.

In some embodiments, the compatiblizing segment may be selected to provide a positive enthalpy of mixing for the composition containing the surface-modified nanoparticles and the curable resin. If the enthalpy of mixing is positive, the dispersion of nanoparticles in the resin is typically stable. To ensure a positive enthalpy of mixing, the solubility parameter of the compatiblizing segment can be matched to the solubility parameter of the curable resin. In some embodiments, the materials can be selected such that the difference in these solubility parameters is no greater than 4 $J^{1/2}$ $cm^{-3/2}$ and, in some embodiments, no greater than 2 $J^{1/2}$ $cm^{-3/2}$ as determined according to *Properties of Polymers; Their Correlation with Chemical Structure; Their Numerical Estimation and Prediction from Additive Group Contributions*, third edition, edited by D. W. Van Krevelen, Elsevier Science Publishers B.V., Chapter 7, 189-225 (1990), i.e., the "Solubility Parameter Procedure."

There are several methods known to determine the solubility parameter of a material such as a compatiblizing segment or a resin. For example, the solubility parameter of the material can be determined from measurements of the extent of equilibrium swelling of the material in a range of solvents of differing solubility parameters. The solubility parameters of the solvents themselves can be determined from their heats of evaporation. The solubility parameter delta (δ) is related to the cohesive energy $E_{coh}$ and the specific volume V by the relationship $\delta=(E_{coh}/V)^{1/2}$. For solvents of low molecular weight, the cohesive energy is closely related to the molar heat of evaporation $\Delta H_{vap}$ according to $E_{coh}=\Delta H_{vap}-p\Delta V=\Delta H_{vap}-RT$. Thus, $E_{coh}$ and δ can be calculated from the heat of evaporation of the solvent or from the course of the vapor pressure as a function of temperature. To determine the solubility parameter of the material, a plot of equilibrium swelling of the material versus the solubility parameter of the solvents is generated. The solubility parameter of the material is defined as the point on this plot where maximum swelling is obtained. Swelling will be less for solvents having solubility parameters that are less than or greater than that of the material. Alternatively, there are several known methods for theoretically estimating the solubility parameter of a material based on the additive contributions of functional groups.

The binding group bonds to the calcite, connecting the surface-modifying agent to the calcite core. Unlike many silica-based nanoparticle systems wherein the surface-modifying agents are covalently bonded to the silica, the surface-modifying agents of the present disclosure are ionically bonded to (e.g., associated with) the calcite.

In order to retain the surface-modifying agents with the calcite cores during processing of the compositions, it may be desirable to select binding groups having high binding energies to calcite. Binding energies can be predicted using density functional theory calculations.

Binding Energy.

Generally, surface-modifying agents include a compatiblizing group to aide in dispersing the nanoparticles in resin, and a binding group to associate the compatiblizing group with the nanoparticles. The binding energy to calcite of various common and potential binding groups can be determined using density functional theory calculations. Details regarding such calculations are available in Pendrew, J. P.; Burke, K. J.; Ernzerhof, M.; Phys. Rev. Lett. 1996, 3865, 77.

Binding Energy Calculation Procedure. The binding energies of different functional groups to the surface of nano-calcite with periodic boundary condition density functional theory (PBC-DFT) were calculated. In this approach, the surface of the nanoparticle was represented a 2D-periodic slab. The calculations were actually periodic in three dimensions, but a 20 Angstrom layer of vacuum was included to prevent the slabs from interacting with each other in the z-direction. As such, the slab had 2D periodicity. The slabs included three to four layers and were cleaved along a Miller plane. For the case of nanocalcite, the surface was cleaved along the {1014} surface.

Two potential surfaces were modeled, a stoichiometric surface and a calcium rich surface. In the case the calcium rich surface, the under-coordinated calcium ions on the surface were terminated with hydroxyl groups. The isolated molecules were calculated in a periodic box that had an edge length of 11 or 12 Angstroms. The distance was large enough to prevent the molecules from interacting with each other.

The PBE density functional (Perdew, J. P.; Burke, K.; Ernzerhof, M.; Phys. Rev. Lett. 1996, 3865, 77), as implemented in the VASP (Vienna ab-initio simulation package) computer program ((a) Kresse, G.; Hafner, J. Phys. Rev. B 1993, 588, 47; (b) Kresse, G.; Hafner, J. Phys. Rev. B 1994, 251, 49; (c) Kresse, G.; Furthmueller, J. Comput. Mater. Sci. 1996, 15, 6; and (d) Kresse, G.; Furthmueller, J. Phys. Rev. B 1996, 11 169, 54) was used for these calculations. The pseudopotentials used were of the plane-wave augmented wave type and distributed with the VASP computer program.

For the case of calcium, the 3p electrons were treated explicitly with the pseudopotential. A plane wave cutoff of 400 eV and 2×2×1 k-point mesh was used for the slab calculations. For the isolated molecules, the pseudopotentials and plane wave cutoffs were identical to those used for the slab calculations, except a 1×1×1 k-point mesh was used.

The binding energies (BE) were calculated in two different ways depending on the surface being assumed.

For the stoichiometric surface:

$$BE=E(Slab)+E(Molecule)-E(Slab+Molecule) \quad (1)$$

wherein, E(Slab+Molecule), E(Slab), and E(Molecule) are the electronic energies of the complex, isolated slab, and isolated molecule, respectively. In all cases, the geometries were optimized to their respective minima.

For the calcium rich surface:

$$BE=E(Slab)+E(Molecule)+E(Water)-E(Slab+Molecule) \quad (2)$$

wherein E(Slab+Molecule), E(Slab), and E(Molecule) are defined above and E(Water) is the electronic energy of an isolated water molecule.

The calculated values in electron volts (e.v.) are summarized in Table 2.

TABLE 2

Calculated binding energy to calcite.

| | | Binding Energy (e.v.) | |
|---|---|---|---|
| Binding group | Structure | calcium rich surface | stoichiometric surface |
| phosphonic acid | R—P(=O)(OH)—OH | 1.18 | 1.15 |
| sulfonic acid | R—S(=O)(=O)—OH | 0.98 | 1.13 |
| phosphoric acid | R—O—P(=O)(OH)—OH | — | 1.45 |
| phosphinic acid | R—P(=O)(R)—OH | 0.68 | — |
| sulfinic acid | R—S(=O)—OH | 0.68 | — |
| carboxylic acid | R—C(=O)—OH | 0.51 | 0.76 |

In some embodiments, the calculated binding energies may be at least 0.5, e.g., at least 0.7 electron volts, as calculated using the Binding Energy Calculation Procedure assuming a calcite rich surface. Generally, the greater the binding energy the greater the likelihood that the binding group will remain ionically associated with the particle surface. In some embodiments, binding energies of at least 0.8, e.g., at least 0.9, or even at least 0.95 electron volts, as calculated using the Binding Energy Calculation Procedure assuming a calcite rich surface, may be useful.

In some embodiments, the binding group comprises a phosphonic acid, e.g., surface-functionalizing agents having a formula:

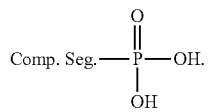

In some embodiments, the binding group comprises a sulfonic acid, e.g., surface-functionalizing agents having a formula:

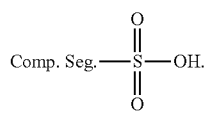

In some embodiments, the surface-modifying agent also comprises a reactive group, i.e., a group capable of reacting with the curable resin, e.g., during the curing process. This can result in the nanocalcite particle being strongly bonded into the resin matrix and may lead to an improvement in the physical properties of the resulting cured nanocomposite. Generally, the reactive group is selected based on the nature of the curable resin. In some embodiments, the reactive group may be located on the end of the compatiblizing segment:

Rx. Group–Comp. Seg.–Binding Group;

wherein "Rx. Group" is the reactive group. In some embodiments, the reactive group may be located along the backbone of, or pendant to, the backbone of the compatiblizing segment. In some embodiments, the reactive group may be located between the compatiblizing segment and the binding group:

Comp. Seg.–Rx. Group–Binding Group.

In some embodiments, a linking group is present connecting the compatiblizing segment with the binding group:

Comp. Seg.–Linking Group–Binding Group.

For example, in some embodiments, the surface-modifying agent comprises a polyetheramine. Exemplary polyetheramines include those available under the trade name JEFFAMINE® available from Huntsman Corporation, The Woodlands, Tex. The polyether serves as a compatiblizing segment, while the amine is the linking group linking the compatiblizing segment with the binding group.

In some embodiments, the surface-modifying agent comprises a zwitterion, i.e., a compound carrying a net charge of zero, but which is capable of carrying a formal positive and negative charge on different atoms. In some embodiments, the formal negative charge is carried by the binding group. In some embodiments, the formal positive charge is carried on the nitrogen atom of an amine, e.g., an amine linking group. In such embodiments, the amine may serve as both the linking group and the reactive group.

Generally, the calcite nanoparticles may be incorporated into any known curable resin or combination of resins. In some embodiments, thermosetting resins and radiation-curable (e.g., ultraviolet light-cured or electron beam-cured) resins may be used.

Suitable resins include, e.g., epoxy resins, polyester resins, bismalimides resins, cyanate ester resins, vinyl ester resins, acrylic resins, urethane resins, and urethane acrylate resins. In some embodiments, polyepoxide resins, including aliphatic and aromatic polyepoxide resins, may be used. Exemplary epoxy resins include those based on bisphenol A, e.g., those available under the trade name EPON™ from Hexion Specialty Chemicals, Inc., Houston, Tex.

Generally, the selection of suitable surface-modifying agents will depend on the selection of the curable resin. Factors affecting the choice of a surface-modifying agent include the solubility parameter, the specific reaction groups, and the curing chemistry of the resins system, which may include not only the curable resin, but also reactive diluents.

Generally, the compositions of the present disclosure comprise at least 10 wt. %, in some embodiments, at least 20 wt. %, e.g., at least 30 wt. %, at least 40 wt. %, or even at least 50 wt. % of the surface modified nanoparticles based on the total weight of the nanoparticles and the curable resin. In some embodiments, it may be useful to have a low viscosity composition, e.g., when the composition is to be sprayed (e.g., when applying a coating), or must flow through fibers (e.g., when making fibrous composites).

Viscosity can be reduced by diluting the composition in solvents, e.g., water, organic solvents, or a combination thereof. If solvents are used, the solvent or combination of solvents can be readily selected such that the resins are soluble. While useful in some applications, the inclusion of solvents tends to increase costs, handling requirements, and process steps. In some embodiments, the compositions of the present disclosure comprise no greater than 5 wt. %, optionally no greater than 2 wt. %, no greater than 1 wt. %, or even no greater than 0.5 wt. % solvent. In some embodiments, certain steps, e.g., milling of the nanoparticles or dispersion of the nanoparticles in the curable resin system may occur in the presence of a solvent. The solvent can then be removed by, e.g., drying, to reduce the residual solvent in the curable composition to the desired level.

In some embodiments, the compositions of the present disclosure may include additional additives such as curing agents, cure accelerators, catalysts, crosslinking agents, dyes, pigments, flame retardants, impact modifiers, and flow control agents. In some embodiments, the compositions may include tougheners, e.g., rubber tougheners. Exemplary rubber tougheners include coreshell rubbers. In some embodiments, nano-sized coreshell rubber tougheners may be used, i.e., coreshell rubber tougheners having an average size of less than 1 micron. In some embodiments, the nano-sized coreshell rubber tougheners have an average size of less than 500 nm, less than 250 nm, or even less than 100 nm. In some embodiments, micron-sized coreshell rubber tougheners may be used, i.e., coreshell rubber tougheners having an average size of greater than 1 micron, e.g., 1 to 10 microns.

The compositions of the present disclosure may be cured. In some embodiments, the curable resin is crosslinked. Any known crosslinking method may be used including exposure to thermal energy or actinic radiation (e.g., ultraviolet light and electron beam radiation). In some embodiments, the curable resin may also react with the surface-modifying agent. For example, in some embodiments, a reactive group of the surface-modifying agent may react with, e.g., covalently bond with, the curable resin.

Various embodiments of the compositions of the present disclosure may be used in a wide variety of applications. In some embodiments, the compositions may be applied to a surface of an article. Such coating may be cured, e.g., crosslinked.

In some embodiments, the compositions of the present disclosure may be used to form fibrous composites. For example, in some embodiments, reinforcing fibers may be impregnated with the composition to form a composite article. Composites may be formed using any known means including, e.g., resin transfer molding (RTM), filament winding, tow placement, resin infusion processes, pultrusion process, or traditional prepreg processes. The resin may then be cured using any known means including exposure to thermal energy and/or actinic radiation.

Generally, any fibers suitable for use in fibrous composites may be used. Exemplary fibers include carbon fibers, glass fibers, ceramic fibers, boron fibers, silicon carbide fibers, polyimide fibers, polyamide fibers, and polyethylene fibers. Combinations of materials may also be used. Generally, the form of the fibers is not particularly limited. Exemplary fiber forms include unidirectional array of individual continuous fibers, woven fabric, knitted fabric, yarn, roving, braided constructions and non-woven mat.

Generally, the compositions of the present disclosure may used in a wide variety of applications including as coatings on, e.g., wind turbine blades and as gel coats on, e.g., vehicles, e.g., boats; and as composites used in the manufacture of, e.g., sporting goods (e.g., rackets, fishing poles, hockey sticks, baseball bats, sailing masts, and the like); wind turbine blades, vehicles and vehicle parts including automobiles, ships, aircraft, and satellites, and space vehicles.

EXAMPLES

TABLE 2

Materials used in the preparation of the examples.

| I.D. | Description | Source |
|---|---|---|
| NanoCa-1 | MULTIFEX MM nanocalcite | Specialty Minerals Corp. |
| NanoCa-2 | SOCAL 31 nanocalcite | Solvay Specialty Chemicals, LTD. |
| NanoCa-3 | ALBAFIL nanocalcite | Specialty Minerals Corp. |
| NanoCa-4 | NPCC-111 nanocalcite | NanoMaterials Technology LTD, |
| NanoCa-5 | NPCC-113 nanocalcite | NanoMaterials Technology LTD |
| EPON 828 | epoxy resin | Hexion Specialty Chemicals, Inc. |
| DETDA | diethyltoluene diamine | ETHACURE-100 Albemarle Corporation, Louisiana, USA |

NanoCa-1,-2,-3, and -5 are provided as dry aggregates, and were used as received. NanoCa-4 is provided as a 56 wt. % slurry of nanocalcite aggregates in water. This slurry was air-dried for three days, followed by additional drying at 50° C. for two hours. The resulting large, clumped agglomerates of nanocalcite aggregates were pulverized in a blender to produce loose, dry aggregates, which were then used.

Sample Preparation

Sulfonic acid ligand was prepared as follows. To 100 g (0.167 mol) of polyetheramine (JEFFAMINE M-600, Mn=600, obtained from Huntsman International, LLC, Salt Lake City, Utah) was added 17.88 g (0.146 mol) of melted propane sultone (purchased from TCI America, Portland, Oreg.). The mixture was heated to 80° C. and stirred for 16 hours. 1H NMR spectra shows complete consumption of the propane sultone. The sulfonic acid ligand ("JAS") was isolated as a red brown liquid and used without further purification. The structure of the JAS ligand was

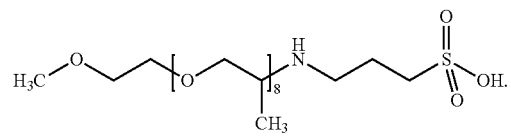

Surface Modification and Dispersion Procedure. A liquid epoxy resin (EPON 828) diluted with a small of amount of methyl ethyl ketone was placed in a container along with the desired amount of surface-modifying agent (the JAS ligand). The solution was agitated with a Cowles shear mixer while slowly adding the dry, nanocalcite aggregates. The solution was agitated until a smooth dispersion was obtained. The final concentration of calcite was between 45 to 50 wt. % of the total composition.

This dispersion was then further milled by repeated cycling through a NETZCH "LabStar" zeta configuration bead mill having a zirconia chamber and zeta mixer. The chamber was 90% filled with 500 micron zirconia milling media. The chamber was cooled with circulating methoxypropanol and the temperature was maintained between 30 to 80° C. during milling. The dispersion was cycled through the mill between 5 and 20 times. The particle size was periodically evaluated until the desired state of dispersion and agglomerate size reduction was reached. In each case, greater than 99% of the calcite agglomerates had an average size of less than 400 nm, as determined according to the Calcite Particle Size Procedure. Following milling, the solvent was stripped under heat and vacuum resulting in a composition containing no greater than 0.1 wt. % solvent.

Curing Procedure. The samples were cured in molds using with an epoxy curing agent, (DETDA) at the level of 38 parts by weight curative per 100 parts epoxy resins (PPH). The components were adjusted so that the final calcite concentration was 35 wt %. The samples were cured in a forced air oven using the following protocol: 75° C. for 3 hours, 125° C. for 2 hours, and 150° C. for 2 hours.

Calcite Particle Size Procedure. The particle size of the calcite was measured by laser diffraction using a HORIBA LA-950 laser diffraction particle size analyzer, including its accompanying software (available from Horiba Instruments, Inc., Irvine, Calif.). The calcite dispersion was diluted to approximately 1% solids with methyl ethyl ketone. The sample was then added to the measurement cell, which was filled with methyl ethyl ketone, until the transmittance was between the recommended levels of 85% to 95%.

The optical model for the calculation used a refractive index of 1.6000 for calcite and 1.379 for the solvent methyl ethyl ketone, and assumed spherical particles. The second differential method was used for smoothing and was based on 150 iterations. The reported values of percent average particle size less than 400 nm (% less than 400 nm) were based on volume fraction averages and static light scattering.

Fracture Toughness Procedure. Fracture toughness of the cured samples was measured according to ASTM D 5045-99 using a compact tension geometry, wherein the specimens had nominal dimensions of 3.18 cm by 3.05 cm by 0.64 cm (1.25 in. by 1.20 in. by 0.25 in.). The following parameters were employed: W=2.54 cm (1.00 in.) and B=0.64 cm (0.25 in.). Crack length, a, was measured for each sample and was about 1.3 cm in each case. A modified loading rate of 0.13 cm/minute (0.050 inches/minute) was used. Values for $K_{Ic}$ are reported in units of megaPascals times the square root of meters, i.e., $MPa \cdot m^{1/2}$. Samples having a fracture toughness of greater than 2.5 did not meet all the criteria of ASTM D 5045-99 to provide valid $K_{Ic}$ values. In particular, the samples were not thick enough and the load displacement curve was not sufficiently linear. However, the reported values of $K_{Ic}$ accurately reflect the relative fracture toughness of these samples compared to the samples having a $K_{Ic}$ of 2.5 or less.

TEM Sample Preparation Procedure. Cured samples of surface-modified nanocalcite in a cured resin were prepared for transmission electron microscopy (TEM) examination as follows. Samples were prepared by room-temperature ultramicrotomy (LEICA UC-6 Ultramicrotome). Thin sections for TEM observation and microanalysis were dry cut using a diamond knife. The sections were generally cut at a thickness of 85 nm. The thin sections were transferred via an eyelash tool to a standard 3 mm TEM grid using a drop of n-propanol as a lubricant to help keep the sections flat. The cured samples were also stained with ruthenium for TEM examination. The prepared TEM thin sections were exposed to $RuO_4$ vapor by suspending the cut sample (on a TEM grid) above an aqueous solution of $RuO_4$ for 5 to 6 minutes in a closed container. $RuO_4$ is known to preferentially stain the sulfonate groups of the JAS ligand in the compositions of the present experiments. Thus, the contrast between the dark, stained ligand-rich regions and the light epoxy resin regions was enhanced. A HITACHI H-9000 high resolution TEM operating at 300 kV was used to obtain the TEM images.

Various nanocalcites were obtained from three commercial sources and examined using time-of-flight secondary ion mass spectrometry (TOF-SIMS) to determine the relative amounts of magnesium and calcium at the surface of the nanocalcite particles. TOF-SIMS is a surface analysis technique in which a pulsed beam of kilovolt energy ions (primary ions) is used to bombard a specimen, resulting in sputtering of its surface. During sputtering, neutral and ionized atomic and molecular species are emitted from the surface. The ionized species are referred to as "secondary ions" to distinguish them from the bombarding primary ions. Secondary ions of one polarity are accelerated in an electric field to a mass spectrometer, where they travel through a flight tube and arrive at the detection and counting system. As a result of the fragments departing from the sample surface at the same time, and being subject to the same accelerating voltage, the lighter fragments arrive at the detection system before the heavier ones. The "time-of-flight" of a fragment is proportional to the square root of its mass, so that different masses are separated during the flight and can be detected individually. The quantity measured in the analysis is the fragment mass divided by the charge amount on the fragment (m/z). TOF-SIMS provides chemical information on the outermost 1 to 2 nm of a material.

TOF-SIMS Test Procedure. TOF-SIMS analysis was performed on samples using an ION-TOF (Münster, Germany) model TOF.SIMS.5 instrument, with a 25 kilovolt (keV) Bi3+ primary ion beam rastered over sample target areas of 200 microns (μm)×200 μm to 500 μm×500 μm. The resulting data was used to calculate the amount of magnesium ion (magnesium 24 isotope) relative to the amount of calcium ion (calcium 44 isotope) at the surface of the particles. The results are summarized in Table 3.

Samples were prepared using the EPON 828 epoxy resin, the various calcites, and 7.5 parts by weight of the JAS ligand per 100 parts by weight of the calcite (i.e., 7.5 pph ligand) according to the Surface Modification and Dispersion Procedure. The dispersions were cured according to the Curing Procedure. The cured samples were evaluated according to the Fracture Toughness Procedure. The fracture toughness is reported in Table 3.

Figure 2:
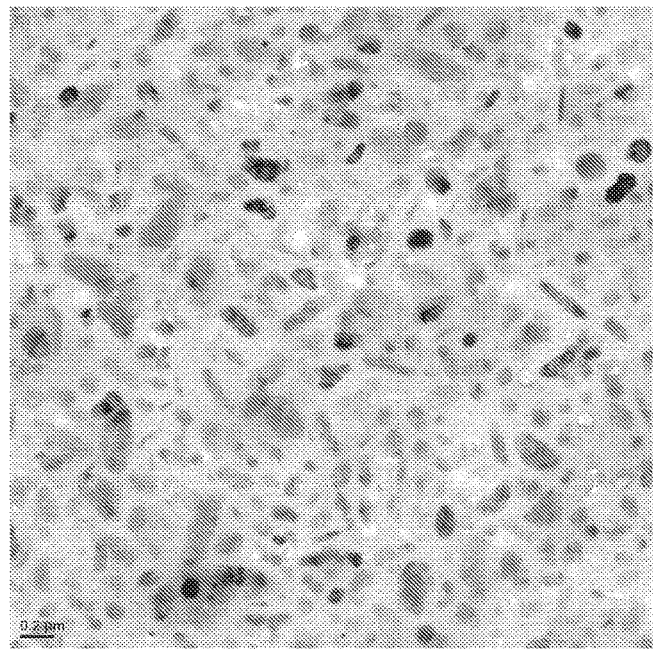
FIG. 2 is a 5000× TEM image of the NanoCa-2 nanocalcite material.
Figure 3:
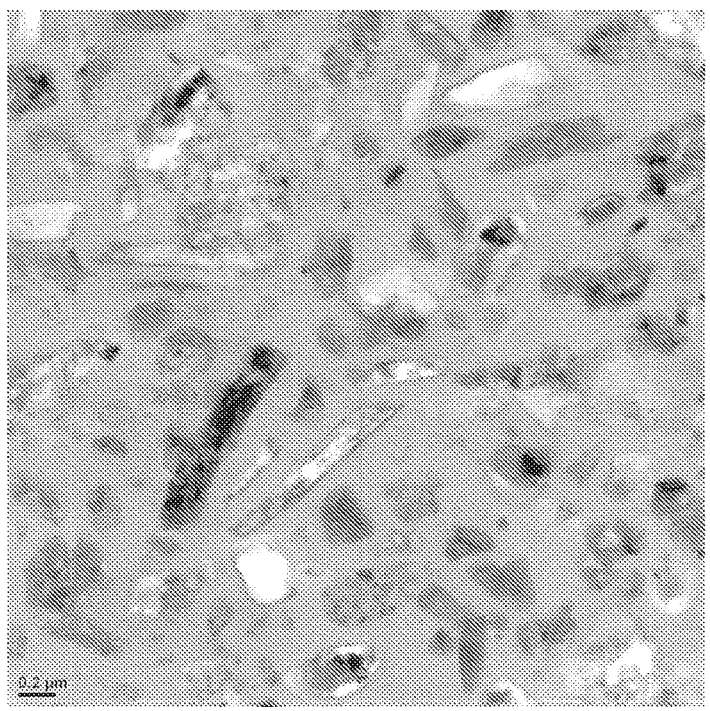
FIG. 3 is a 5000× TEM image of the NanoCa-3 nanocalcite material.
Figure 4:
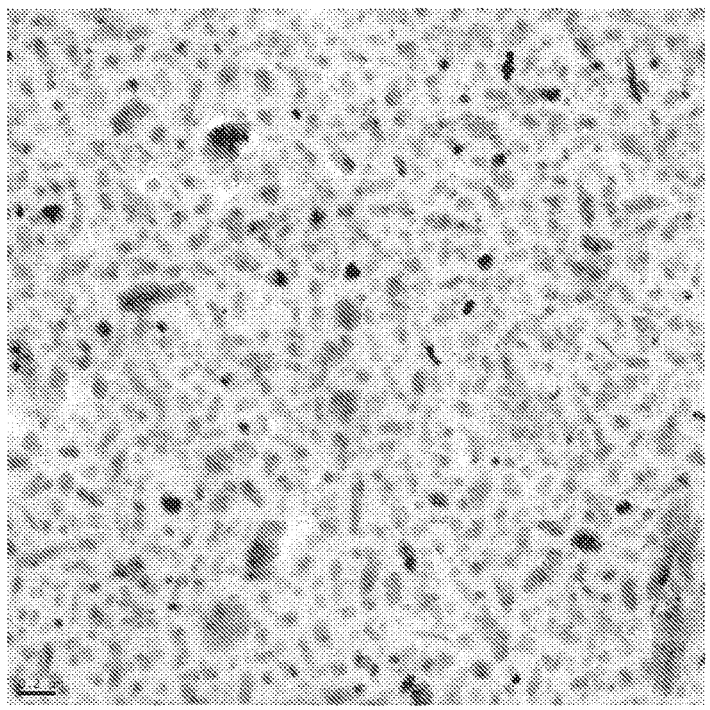
FIG. 4 is a 5000× TEM image of the NanoCa-4 nanocalcite material.
Figure 5:
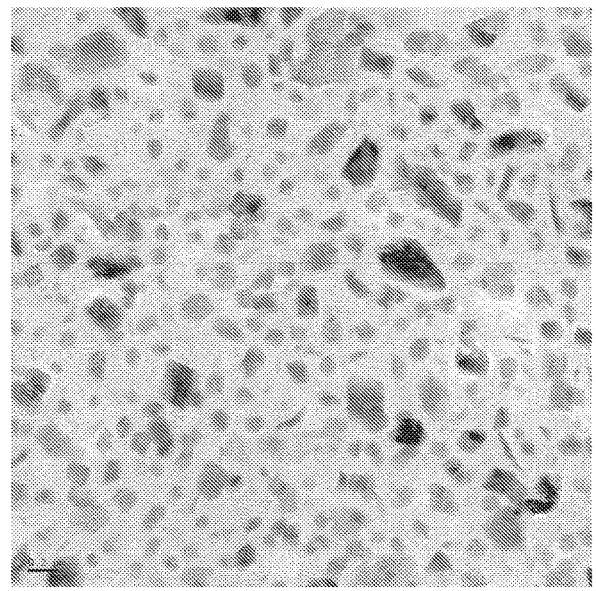
FIG. 5 is a 5000× TEM image of the NanoCa-5 nanocalcite material.

Samples were prepared according to the TEM Sample Preparation Procedure. TEM images were taken of the prepared samples at 5000× magnification. Referring to FIGS. 1, 4, and 5, TEM images of the NanoCa-1, NanoCa-4, and NanoCa-5 nanocalcite materials, respectively, show a substantially isotropic, cubic morphology. The TEM image of the NanoCa-2 nanocalcite of FIG. 2 shows a somewhat more varied and anisotropic morphology. As shown in FIG. 3, the NanoCa-3 nanocalcite had highly anisotropic particle shapes including plates and needles. In each case, the particles were well-dispersed in the cured resin.

TABLE 3

Nanocalcite characterization results and fracture toughness.

| Ex. | Calcite | Particle morphology | Mg to Ca surface concentration ratio | $K_{Ic}$ ($MPa \cdot m^{1/2}$) |
|---|---|---|---|---|
| CE-1 | NanoCa-4 | Nearly isotropic | 0.63 | 1.07 |
| CE-2 | NanoCa-1 | Nearly isotropic | 0.74 | 1.22 |
| EX-1 | NanoCa-5 | Nearly isotropic | 4.45 | 2.27 |
| EX-2 | NanoCa-2 | Varied, somewhat anisotropic | 6.34 | 2.36 |
| EX-3 | NanoCa-3 | Irregular, highly anisotropic | 17.8 | 3.1 |

As received samples of NanoCa-1, NanoCa-2, and NanoCa-3 were lightly ground by hand with a motar and pestle to break up the largest agglomerates. A thin cake of freshly ground calcite nanoparticles was spread onto a potassium bromide salt plate. Care was taken to be sure the sample was sufficiently thin for transmission experiments such that no distortion of absorption features were observed as a result of an optically opaque sample Infrared spectral data was acquired on a Bruker Optics, Hyperion Series 2000 FT-IR microscope operated in transmission mode. The number of co-added scans ranged 32 to 128 with the same number acquired for both the air background and sample measurements. Spectral data was obtained at 4 $cm^{-1}$ resolution in the region of 650-4000 cm-1.

Figure 6:
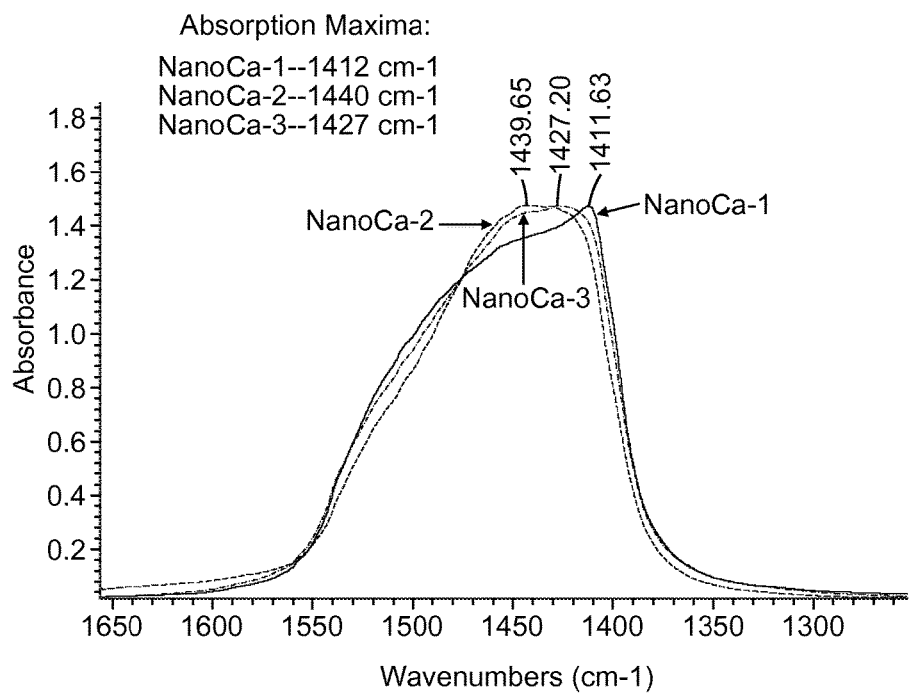
FIG. 6 is a graph showing infrared spectral data for various nanocalcites, highlighting the asymmetric carbonate C—O peak.

As shown in FIG. 6, NanoCa-2 and NanoCa-3, which had high Mg:Ca surface concentration ratios, showed an asymmetric carbonate C—O peak between 1425 and 1440 $cm^{-1}$. In contrast, NanoCa-1, which had a Mg:Ca surface concentration ratio of less than 1, showed an asymmetric carbonate C—O peak which was shifted to between 1410 and 1415 $cm^{-1}$.

Additional samples were prepared using the EPON 828 epoxy resin, different calcites, and various amounts of the JAS ligand as summarized in Table 4. Dispersions were prepared according to the Surface Modification and Dispersion Procedure. The dispersions were cured according to the Curing Procedure. The cured samples were evaluated according to the Fracture Toughness Procedure. The wt. % ligand, the 24Mg:44Ca ration, and the fracture toughness are reported in Table 4.

TABLE 4

Nanocalcite composite data.

Figure 7:
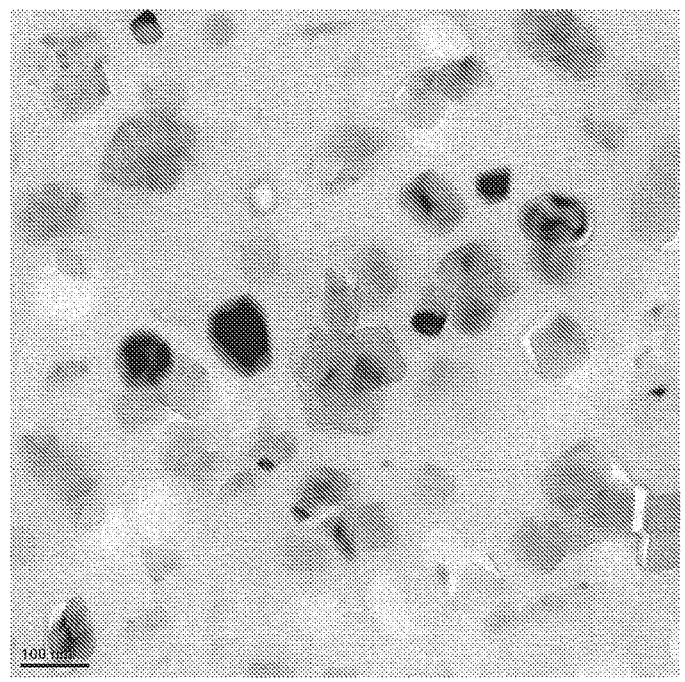
FIG. 7 is a 20,000× TEM image of NanoCa-1 nanocalcite with 5% ligand in a resin.
Figure 8:
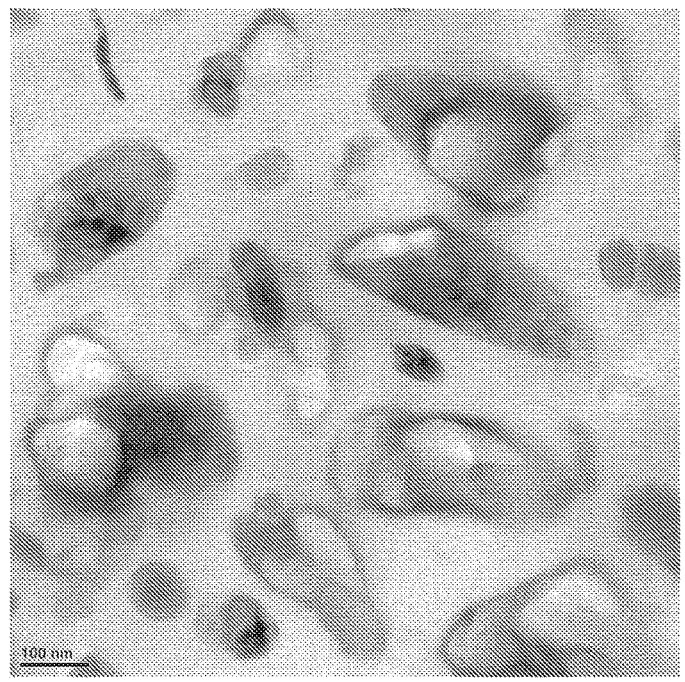
FIG. 8 is a 20,000× TEM image of NanoCa-2 nanocalcite with 5% ligand in a resin.
Figure 9:
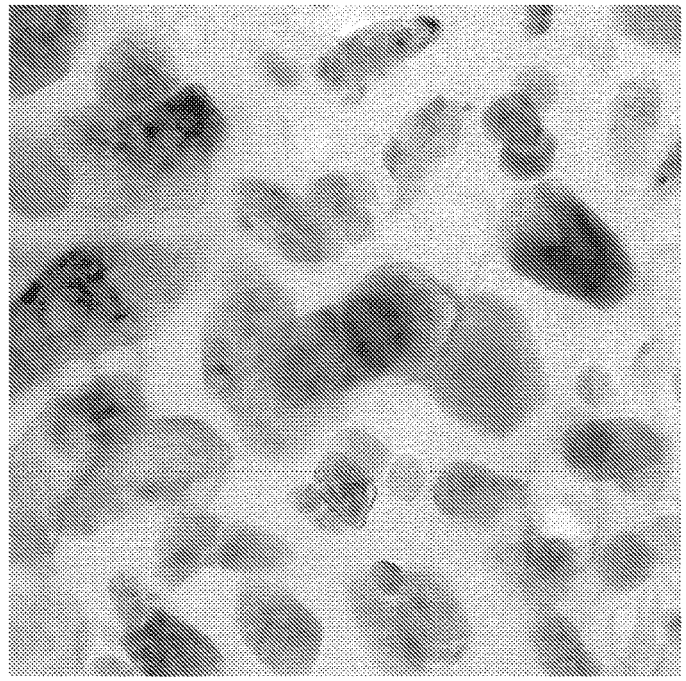
FIG. 9 is a 20,000× TEM image of NanoCa-2 nanocalcite with 7.5% ligand in a resin.
Figure 10:
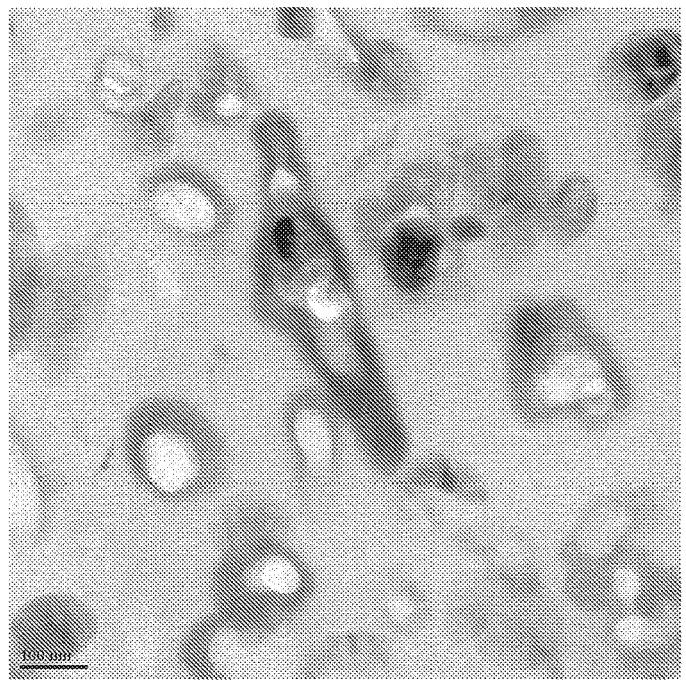
FIG. 10 is a 20,000× TEM image of NanoCa-2 nanocalcite with 20% ligand in a resin.
Figure 11:
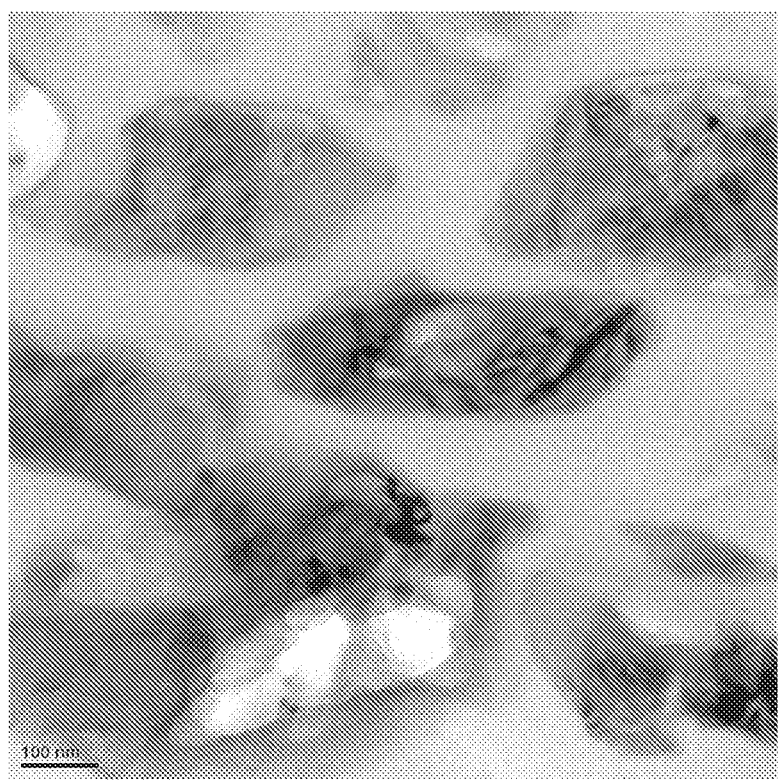
FIG. 11 is a 20,000× TEM image of NanoCa-3 nanocalcite with 7.5% ligand in a resin.

| Ex. | Calcite | Ligand (wt. %) | $^{24}$Mg:$^{44}$Ca (*) | $K_{Ic}$ (MPa·m$^{1/2}$) | FIG. |
|---|---|---|---|---|---|
| CE-1 | NanoCa-1 | 5 | 0.74 | 1.22 | FIG. 7 |
| EX-4 | NanoCa-2 | 5 | 6.34 | 2.00 | FIG. 8 |
| EX-1 | NanoCa-2 | 7.5 | 6.34 | 2.28 | FIG. 9 |
| EX-5 | NanoCa-2 | 20 | 6.34 | 2.7 | FIG. 10 |
| EX-2 | NanoCa-3 | 7.5 | 17.8 | 3.0 | FIG. 11 |

(*) Concentration of $^{24}$Mg relative to $^{44}$Ca at the surface of the calcite particles as measured using TOF-SIMS.

The cured samples were also processed according to the TEM Sample Preparation Procedure. Images were collected at 20,000× magnification. Referring to FIG. 7, Comparative Example CE-1, which had a $^{24}$Mg:$^{44}$Ca surface concentration ratio of less than 1, did not have a significant concentration of the ligand around the surface of the calcite particles, as indicated by the lack of a stained, dark halo around the calcite particles. However, the nanocalcite particles were well-dispersed indicating that the particles were surface-modified by the ligand.

Referring to FIGS. 8-11, EX-1, EX-2, EX-4, and EX-5 showed significant concentrations of the ligand forming a ligand-rich shell around the nanocalcite, i.e., the relatively dark halo around the particles. In addition to the staining results, the composition of the shell was confirmed to be the ligand by energy dispersive spectroscopy (EDS) and high angle, annular, dark field imaging (HAADF). These samples, which were prepared using calcites having a ratio of a $^{24}$Mg:$^{44}$Ca surface concentration ratio of greater than 1, exhibited substantially higher fracture toughness.

Typically, surface-modifying agents have been used at or slightly above the equilibrium amount, i.e., the amount required to achieve a monolayer on the surface of the nanoparticle. The equilibrium amount is affected by a variety of factors including available binding sites, particle surface area, and steric effects associated with the particular surface modifying agent. Any excess surface modifying agent generally remains dispersed in the curable resin system due to the compatibility of the compatibilizing portion of the surface modifying agent and the curable resin. The present inventors have surprisingly discovered that surface-modifying-agent rich shells can be formed around calcite nanoparticles having a high surface concentration of magnesium. Thus, in some embodiments, improved compositions, including coatings and fiber composites can be made by selecting calcite nanoparticles having a high magnesium to calcium surface concentration ratio.

Various modifications and alterations of this invention will become apparent to those skilled in the art without departing from the scope and spirit of this invention.

What is claimed is:

1. A composition comprising surface-modified nanoparticles dispersed in a curable resin which is a curable epoxy resin, wherein the surface-modified nanoparticles comprise calcite cores having a magnesium 24 isotope to calcium 44 isotope surface concentration ratio of greater than 1 as measured according to the TOF-SIMS Test Procedure, and a first surface-modifying agent according to the formula:

Compatiblizing Segment–Binding Group or the formula:

Compatiblizing Segment–Linking Group–Binding Group the first surface-modifying agent comprising a binding group ionically bonded to the nanoparticle and a compatiblizing segment compatible with the curable resin; wherein at least 70%, of the calcite cores have an average size of less than 400 nm as measured by the Calcite Particle Size Procedure.

2. The composition of claim 1, wherein the magnesium 24 isotope to calcium 44 isotope surface concentration ratio is greater than 4 as measured according to the TOF-SIMS Test Procedure.

3. The composition of claim 2, wherein the magnesium 24 isotope to calcium 44 isotope surface concentration ratio is greater than 10 as measured according to the TOF-SIMS Test Procedure.

4. The composition according claim 1, wherein the difference between the solubility parameter of the curable resin and the solubility parameter of the compatiblizing group, as determined according to the Solubility Parameter Procedure, is no greater than 4 $J^{1/2}$ cm$^{-3/2}$.

5. The composition according to claim 1, wherein the binding group has a binding energy of at least 1.0 electron volts to calcite as calculated using the Binding Energy Calculation Procedure assuming a stoichiometric surface.

6. The composition according to claim 1, wherein at least 90%, of the calcite cores have an average size of less than 400 nm as measured by the Calcite Particle Size Procedure.

7. The composition according to claim 1, wherein at least 70% the calcite cores have an aspect ratio of greater than 1.5.

8. The composition according to claim 1, wherein the surface-modified nanoparticles further comprise a ligand-rich shell surrounding the calcite core.

9. The composition according to claim 1, wherein the first surface-modifying agent further comprises a reactive group capable of reacting with the curable resin.

10. The composition according to claim 1, further comprising a second surface-modifying agent bonded to the calcite, wherein the second surface-modifying agent comprises a binding group and a reactive group capable of reacting with the curable resin.

11. The composition according to claim 1, wherein the composition comprises at least 10 wt. % nanoparticles based on the total weight of the nanoparticles and the curable resin.

12. The composition according to claim 1, wherein the composition comprises no greater than 2 wt. % solvent.

13. A cured composition comprising the composition according to claim 1, wherein the curable resin is cured.

14. A coated article comprising a substrate and the cured composition of claim 13 bonded to at least a portion of the substrate.

15. A fibrous composite comprising the composition according to claim 1 and reinforcing fibers, wherein the reinforcing fibers are impregnated with the composition.

16. The fibrous composite of claim 15, wherein the curable resin is cured.

17. A method of making a composition comprising (i) selecting a calcite having a magnesium 24 isotope to calcium 44 isotope surface concentration ratio of greater than 4 as measured according to the TOF-SIMS Test Procedure, (ii) milling the calcite until greater than 90% of the calcite has an average size of less than 400 nm as measured by the Calcite Particle Size Procedure, (iii) ionically bonding a binding group of a first surface modifying agent according to the formula:

Compatiblizing Segment–Binding Group or the formula:

Compatiblizing Segment–Linking Group–Binding Group to the calcite, wherein the binding group has a binding energy of at least 1.0 electron volts to calcite as calculated using the Binding Energy Calculation Procedure assuming a stoichiometric surface; and (iv) dispersing the surface-modified calcite in a curable resin which is a curable epoxy resin to form a dispersion, wherein the difference between the solubility parameter of the curable resin and the solubility parameter of a compatiblizing group of the first surface modifying agent, as determined according to the Solubility Parameter Procedure, is no greater than 4 $J^{1/2}$ $cm^{-3/2}$.

18. The method of claim of claim 17, further comprising (v) at least one of (a) impregnating fibers with the dispersion and (b) applying the dispersion to a substrate; and (vi) curing the curable resin.

19. The composition of claim 1 wherein the compatiblizing segment is selected from the group consisting of polyalkylene oxides, polyesters and polyether amines.

20. The composition of claim 1 wherein the compatiblizing segment is selected from the group consisting of polyalkylene oxides.

21. The composition of claim 1 wherein the binding group is a sulfonic acid group.

22. The composition of claim 19 wherein the binding group is a sulfonic acid group.

23. The composition of claim 20 wherein the binding group is a sulfonic acid group.

24. The method of claim 17 wherein the compatiblizing segment is selected from the group consisting of polyalkylene oxides, polyesters and polyether amines.

25. The method of claim 17 wherein the compatiblizing segment is selected from the group consisting of polyalkylene oxides.

26. The method of claim 17 wherein the binding group is a sulfonic acid group.

27. The method of claim 24 wherein the binding group is a sulfonic acid group.

28. The method of claim 25 wherein the binding group is a sulfonic acid group.

* * * * *